United States Patent [19]
Maughlin et al.

[11] 3,895,767
[45] July 22, 1975

[54] QUICK ATTACHABLE TOW CABLE ADAPTER FOR A-7 AIRPLANES

[75] Inventors: Richard K. Maughlin, Great Milk; John B. Dexter, California, both of Md.

[73] Assignee: The United States of America as represented by the Secretary of the Navy, Washington, D.C.

[22] Filed: Sept. 9, 1974

[21] Appl. No.: 504,611

[52] U.S. Cl. .................. 244/3; 24/230 A; 40/215; 273/105.3; 280/504
[51] Int. Cl.² .......................................... B64D 3/02
[58] Field of Search ............ 244/1TD, 1 T, 1 D, 3, 244/137 R, 110 G; 273/105.3; 280/504, 495; 40/215; 213/75 R, 78; 24/230 A, 230 AV; 403/326, 327, 330

[56] References Cited
UNITED STATES PATENTS

| | | |
|---|---|---|
| 2,011,202 | 8/1935 | Satterlee .......................... 40/215 |
| 2,153,562 | 4/1939 | Hougard .......................... 40/215 |
| 2,221,492 | 11/1940 | Sawyer .......................... 280/504 |
| 2,947,523 | 8/1960 | Seeley et al. .................... 244/3 X |

*Primary Examiner*—Trygve M. Blix
*Assistant Examiner*—Barry L. Kelmachter
*Attorney, Agent, or Firm*—R. S. Sciascia; P. Schneider

[57] ABSTRACT

A tow adapter for providing towing capability to the A-7 naval aircraft. The adapter has pins for insertion into the recess of a pair of nuts in the arresting hook assembly of the aircraft. The adapter also has a fore section and an aft section which is spaced from the fore section and is depressible to rotate downwards with respect to the fore section. This depression of the aft section exposes slots into which a tow ring can be inserted. Thereafter, release of the aft section, which is spring-biased to bring it back into its original position, causes a tongue to be inserted through the tow ring so that it cannot escape from the slots.

4 Claims, 7 Drawing Figures

PATENTED JUL 22 1975 3,895,767

QUICK ATTACHABLE TOW CABLE ADAPTER FOR A-7 AIRPLANES

STATEMENT OF GOVERNMENT INTEREST

The invention described herein may be manufactured and used by or for the Government of the United States of America for governmental purposes without the payment of any royalities thereon or therefor.

BACKGROUND OF THE INVENTION

This invention relates to the towing of gunnery targets by aircraft and especially to an adapter for permitting the towing of a target by a fighter aircraft.

The standard attack aircraft used by the U.S. Fleet at the present time is the model A-7. Fleet A-7 squadrons are capable of air-to-air gunnery using a gun system and a Navigation/Weapons computer. To obtain adequate training, the A-7 squadrons need to be able to tow aerial banners (targets) behind them. However, the A-7 aircraft has no means for attachment of an aerial banner.

SUMMARY OF THE INVENTION

The invention comprises a tow adapter which can be fastened to an arresting hook assembly of the type carried by an A-7 naval aircraft. The invention has an aft section and a fore section which are spaced from each other, the aft section being depressible to rotate downwardly from the fore section. The depression of the aft section acts to open slots in the latching mechanism and a tow ring can be inserted in the slots. The aft section is spring-biased so that, when released, it inserts an upright member through the tow ring and closes off the slots to lock the tow ring to the tow adapters.

OBJECTS OF THE INVENTION

An object of this invention is to permit attachment of an aerial banner, or target, to an aircraft having the A-7 aircraft type of arresting hook assembly.

Other objects, advantages and novel features of the present invention will become apparent from the following detailed description of the invention when considered in conjunction with the accompanying drawing.

DETAILED DESCRIPTION OF THE INVENTION

Figure 1:
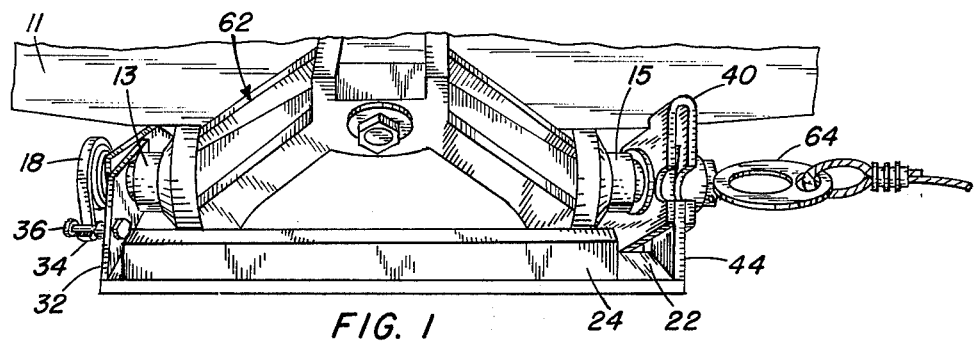
FIG. 1 is an isometric illustration of the invention being placed on the arresting hook assembly of an A-7 aircraft.

FIG. 1 shows the tow adapter 10 fitted to an A-7 aircraft's arresting hook assembly which is located beneath the aircraft 11 (partially shown). The arresting hook assembly has a triangular configuration with one apex toward the rear of the plane and the side connecting the other two apexes being perpendicular to the center line of the aircraft. Nuts 13 and 15 are located at these latter two apexes; the nuts have recesses in them into which components of the tow adapter fit, as will be explained.

Figure 2:
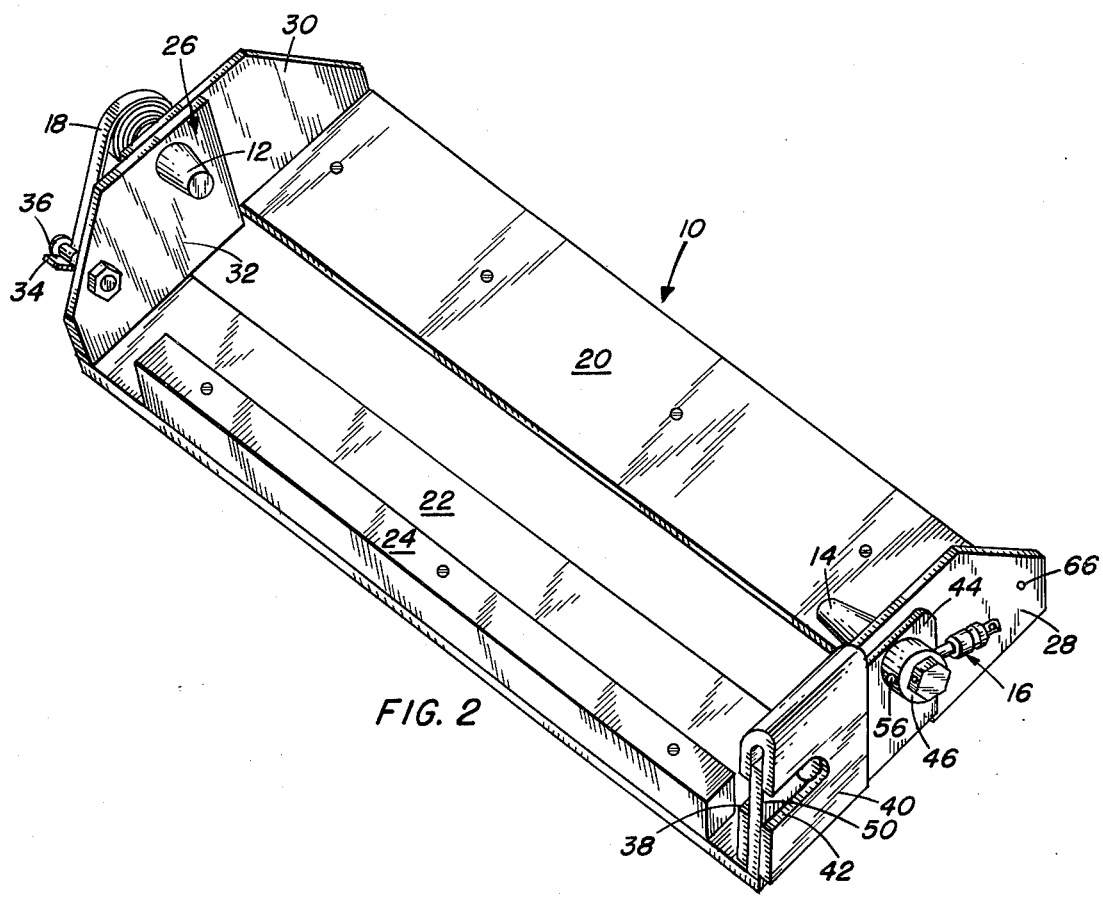
FIG. 2 is a schematic illustration of an embodiment of the invention.
Figure 4:
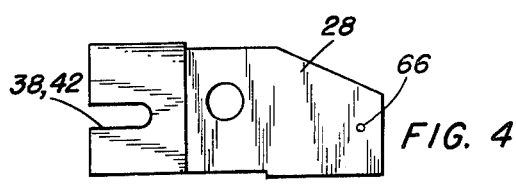
FIG. 4 is a schematic end view of the right end upright member showing its slot.

FIG. 2 shows the tow adapter 10 in greater detail. The adapter has a fore cross member 20 (fore as related to its aircraft location) and an aft cross member 22, each comprising a rectangular plate. The aft cross member 22 supports a compressible rectangular block 24 which is attached so that it runs crosswise along the aft edge of the cross member 22. The block 24 may be made of rubber, for example, and its function is to prevent scuffing of the hook assembly by the tow adapter. The top surface of the fore cross member 20 may also have a protective surface, such as a plastic plate, to prevent scuffing.

The cross members support left and right end members 26 and 28, respectively, which are perpendicular (or upright) relative to the plane of the cross members. The left end member 26 is actually comprised of two sections which may be designated the fore LE (left end) section 30 and the aft LE (left end) section 32, the fore LE section 30 being affixed to the fore cross member 20 and the aft LE section 32 being affixed to the aft cross member 22. A tapered pin 12 extends through holes in the two upright sections and is attached at its left side to one end of a spiral spring biasing means 18. The other end 34 of the spiral spring 18 is tied down to a bolt 36. The aft LE section 32 and aft cross member 22 rotate downwardly around the tapered pin 12 which is affixed to the fore LE section 30.

Figure 3:
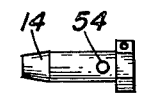
FIG. 3 is a schematic illustration of the tapered stud.

The right end upright member 28 is shown in end view in FIG. 3. Note that it is formed with a slot 38. The right end upright member 28 is also formed with a folded member 40 at its aft end which is spaced from it and has a similarly shaped and located slot 42 therein. The aft cross member 22 is formed with an upright end member 44 (rotatable RE upright member) which moves with it as it rotates around a tapered pin, or stud, 14 which extends through aligned holes (not shown) in the right end upright member 28, in the rotatable RE upright member 44 and in a cylindrical bearing 46.

Figure 5:
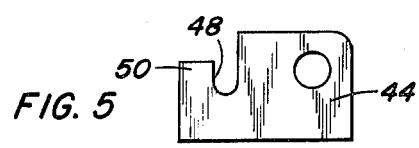
FIG. 5 is a schematic end view of the rotatable right end upright member.
Figure 6:
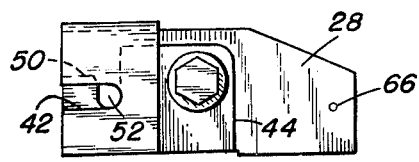
FIG. 6 is a schematic illustration of the relation between the normal positions of the right end upright members and their slots.
Figure 7:
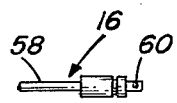
FIG. 7 is a schematic illustration of the locking pin.

The rotatable RE upright member 44 is formed with a recess, or slot, 48. The relation of the rotatable RE upright member 44 and the right end upright member 28 is shown in FIG. 5. Note that the aft end 50 of the rotatable RE member (which will be designated "the tow ring locking tongue") normally extends above the opening of slots 38 and 42, thus closing them off, and that part of slots 38, 42 and 48 always form an opening 52 through the upright end members 28 and 44. The portion of the RE upright member 28 containing the folded member 40 and the slots 38 and 42 and the rotatable RE upright member with its locking tongue 50 and slot 48 can be considered a latching means, or mechanism.

The tapered stud 14 (FIG. 3) has a hole 54 bored through it which can be aligned with a pair of holes 56 bored through the stud bearing 46. The narrow part 58 of a locking pin 16 is insertable through these holes to prevent the tapered stud 14 from coming out of the bearing 46. The pin 16 has a hole 60 bored through its top section. A wire (not shown) is then inserted through the locking pin hole 60 and through another hole 66 in the RE upright member 28 to keep the pin 16 from being lost when removed from the stud 14.

To use the tow adapter 10, the tapered stud 14 is first removed. The tapered pin 12 is inserted in a recess in the nut 13 at the left apex of the arresting hook assembly 62 and the stud hole through the RE upright member 28 is aligned with the recess in the nut 15 at the right apex of the hook assembly 62. The tapered stud 14 is now inserted through the bearing 46 and upright member 46 into the nut recess. The locking pin 16 is then inserted through the holes 56 and 54 to lock the tow adapter into place on the hook assembly.

When ready to tow an aerial banner, a line from the latter is attached to a tow ring 64. The aft cross member 22 is depressed, thereby opening the slots 38 and 42 in the RE upright members and the tow ring is inserted therein. When the cross member is released, the locking tongue 50 of the rotatable RE upright member passes through the tow ring 64 and the latter is then locked into the adapter 10.

The tow ring can be released by depressing the aft cross member either by hand or, in flight, by activation of the aircraft arresting hook which rotates the aft cross member. The arresting hook assembly rotates around the two recessed nuts, a line through the nuts being the axis of hook rotation. The rear apex of the hook triangle rotates downwards as the hook is lowered from the aircraft.

Obviously, many modifications and variations of the present invention are possible in light of the above teachings. It is therefore to be understood that, within the scope of the appended claims, the invention may be practiced otherwise than as specifically described.

What is claimed is:

1. A tow adapter for coupling with the recesses in the apical nuts of the arresting hook assembly of the type used in A-7 naval aircraft comprising, in combination:
    a fore cross member oriented transversely to the fore-aft axis of an aircraft and having an upright member at each port and starboard end, each end member having a hole therein, the centers of said holes being in alignment, said fore cross member having a folded-over member at its aft end spaced from one of the upright members, both the upright and the folded-over member having corresponding slots extending in a fore-aft direction from the extreme aft portions of the members;
    an aft cross member spaced aft from and parallel to said fore-cross-member, said aft cross member having a pair of upright end members affixed thereto and adjacent to said fore-cross-member upright members, the upright member on one side of the fore-aft axis of the aft cross member having a hole therein aligned with the hole in its adjacent fore-cross-member upright member, the upright member on the other side of the aft cross member fitting inside the space between the folded-over member and its upright member and having a hole therein aligned with the hole in its adjacent fore-cross-member upright member and being formed with a tongue at its aft end and with an opening positioned fore of the tongue, said tongue covering the aft part of the fore-aft slots in its normal position and the opening in the aft upright member corresponding in position with the non-covered part of the fore-aft slots; and
    a pair of support pins extending through the holes in the upright members, a different one through each upright member for engagement with the nut recesses of an arresting hook assembly, one pin being easily removable from its associated holes;
    biasing means attached to one of said pins and to an aft-cross-member upright member for biasing said aft cross member to a normal position wherein said tongue covers the aft portion of said fore-aft slots, said aft cross member being depressible relative to said fore cross member; and
    locking means for preventing removal of said easily removable pin from its holes,
    a towing ring being insertable in said foreaft slots when said aft cross member is depressed, said tongue extending through said towing ring when the aft cross member is released and being locked in place around said tongue until said aft cross member is again depressed.

2. A towing adapter as in claim 1, wherein said biasing means is a spiral spring.

3. A towing adapter as in claim 1, wherein said locking means comprises a locking pin having a hole at one end, said adapter further including a sleeve bearing attached to said upright member which has a tongue thereon, the hole in said sleeve bearing being aligned with the holes in said upright members, the easily removable support pin fitting through said sleeve bearing and holes, said sleeve bearing and said easily removable pin having holes therein which can be aligned to admit said locking pin, whereby said easily removable pin is prevented from being removed from the holes in the upright members and from the sleeve bearing.

4. A towing adapter as in claim 1, further including a block of resilient material affixed to said aft cross member between it and the arresting hook assembly so as to protect the latter from scuffing.

* * * * *